United States Patent [19]
Fluckiger

[11] 3,912,470

[45] Oct. 14, 1975

[54] SEPARATOR FOR SEPARATING GASES OF DIFFERENT MOLECULAR WEIGHT AND CHROMATOGRAPHY ARRANGEMENT

[75] Inventor: Rudolf Fluckiger, Balzers, Switzerland

[73] Assignee: Balzers Patent-und Beteiligungs-Aktiengesellschaft, Liechtenstein

[22] Filed: June 24, 1974

[21] Appl. No.: 482,273

[30] Foreign Application Priority Data
June 27, 1973 Switzerland............... 009470/73

[52] U.S. Cl. ............... 55/386; 55/17; 55/392; 137/842
[51] Int. Cl.² ............................................. B01D 15/08
[58] Field of Search ......... 55/17, 67, 197, 386, 392; 137/842

[56] References Cited
UNITED STATES PATENTS

| | | | |
|---|---|---|---|
| 2,607,439 | 8/1952 | Dickens | 55/17 |
| 3,429,322 | 2/1969 | Metzger | 137/842 |
| 3,498,027 | 3/1970 | Buchtel | 55/197 |
| 3,556,409 | 1/1971 | Johannisson | 137/842 |
| 3,616,596 | 11/1971 | Campargue | 55/17 |

*Primary Examiner*—Bernard Nozick
*Attorney, Agent, or Firm*—McGlew and Tuttle

[57] ABSTRACT

The separator has an evacuable chamber provided with an inlet nozzle for the gases, an outlet nozzle facing the inlet nozzle, an apertured diaphragm or the like controlling the stream of the useful gas removed through the outlet nozzle and a connection to a vaccum pump to evacuate the residual gas. A further nozzle is provided to direct a stream of auxiliary gas into the said chamber and is arranged, relative to the firstmentioned inlet nozzle, that the two gas streams produced in the evacuated chamber through the two inlet nozzles intersect each other, preferably at a right angle. A supply line to the auxiliary gas nozzle contains a valve whereby the force of the auxiliary gas stream may be regulated to control the amount of gas flowing out through the outlet nozzle. The auxiliary gas may be the same gas as used for the carrier gas. The outlet nozzle may be connected to a mass spectrometer or the like, particularly to an evacuated ionization chamber thereof.

6 Claims, 4 Drawing Figures

SEPARATOR FOR SEPARATING GASES OF DIFFERENT MOLECULAR WEIGHT AND CHROMATOGRAPHY ARRANGEMENT

FIELD AND BACKGROUND OF THE INVENTION

This invention relates to a separator for separating gases having different molecular weights and, more particularly, to a separator for the partial separation, in gas chromatography, of the carrier gas from the gas to be analyzed.

Such separators have been disclosed, for example, in German Pat. No. 1,052,955, in German Offenlegungsschrift 1,919,460, in Swedish Pat. No. 221,621, in U.S. Pat. No. 3,633,027, and in British Pat. No. 1,065,131, to which reference may be made for the general organization of apparatus for partial separation of the carrier gas from the gas to be analyzed in gas chromatography.

Such separators permit a more or less intense enrichment of the gas to be analyzed relative to the carrier gas. In gas chromatography, the gas mixture to be separated at least partially is passed through a usually nozzle-like aperture into an evacuated space, and the expanding gas stream is split up, by means of an apertured diaphragm, placed in the path of the stream, into a peripheral part and a core part, with the core part passing through an aperture in the diaphragm. Due to the different molecular weights, the heavy components, relative to the lighter ones, are concentrated in the core part of the stream, which is then evacuated through an outlet opening, usually in the form of a nozzle, as a stream of useful gas. Such an enrichment of the gas to be analyzed is desired in order to obtain a more favorable signal-to-noise ratio in a detector downstream of the outlet opening. More specifically, the carrier gas causes a noise background limiting the detection efficiency of the gas chromatographic process.

It is well known to provide a mass spectrometer downstream of a gas chromatographic separation device for permitting the examination of the mass spectrum of the individual components of the analyzed gas emerging from the separating column. In such a case, the carrier gas in excess may sometimes be disturbing further by causing an inadmissible increase of the pressure in the ionization chamber of the mass spectrometer.

Another problem arises if the gas to be analyzed contains some components in substantially larger quantities than other components, which frequently happens with respect to the solvent of the examined sample. Such components present in excess cause an accelerated contamination of the analytical system. It is, of course, possible to provide a shut-off valve in the connection line between the gas chromatographic separating column and the detector, such as a mass spectrometer, and which valve is opened only for the passage of the interesting components. However, this measure has the drawback that such a valve entails an additional dead space, resulting in time-extended detector signals. Measuring errors also may occur if the construction materials of the valve have a different absorption, relative to the components to be examined, or are catalytically effective.

In a known device, a one-stage or two-stage stream separator is connected between the gas chromatographic separating column and the mass spectrometer, and a movable shut-off element, in the form of a thin plate which may be shifted into a position to close the outlet opening, is provided in the separation chamber of the separator. Thereby, the outlet opening can be opened and closed selectively. Since, in operation, the separator sometimes must be heated up to approximately 400° C and worked under low pressure, an appropriate mechanism for effecting the movement of or shifting of the thin plate is necessary. This, however, results in a relatively expensive construction.

SUMMARY OF THE INVENTION

The invention is directed to a design of a separator, of the type mentioned above, permitting a control of the stream of useful gas without using a mechanical shut-off element in the separator chamber.

The invention is applicable to a separator for separating gases having different molecular weights, particularly for partial separation, in gas chromatography, of the carrier gas from the gas to be analyzed, and comprising a chamber which can be evacuated and is provided with an inlet opening for the gases, an outlet opening facing the inlet opening and a device for controlling the stream of useful gas evacuated through the outlet opening, the chamber having a connection for a pump for evacuating the residual gas.

In accordance with the invention, such a chamber is provided with at least one further inlet opening for an auxiliary gas in the form of an auxiliary gas stream in the chamber, and this opening is arranged, relative to the first-mentioned inlet opening, in a manner such that the two gas streams, produced in the evacuated chamber by the respective inlet openings, intersect each other.

With such a design of the separator, it is possible, by supplying an auxiliary gas, to deviate the stream of the gas to be analyzed more or less away from the outlet opening, with the amount of the deviation being controllable by an appropriate adjustment of the auxiliary gas stream. This adjustment may be effected by means of a valve, preferably a needle valve, mounted in the supply line for the auxiliary gas, outside the separator.

An object of the invention is to provide an improved separator for separating gases of different molecular weight, particularly for partial separation, in gas chromatography, of the carrier gas from the gas to be analyzed.

Another object of the invention is to provide such a separator in which control of the stream of useful gas is effected without using a mechanical shut-off element in a separator chamber.

A further object of the invention is to provide such a separator in which an auxiliary gas stream is directed into the separator chamber, in addition to the carrier gas-analysis gas, in such a manner that the two gas streams, produced in the evacuated separator chamber, intersect each other.

For an understanding of the principles of the invention, reference is made to the following description of a typical embodiment thereof as illustrated in the accompanying drawing.

DESCRIPTION OF THE PREFERRED EMBODIMENT

Figure 1A:
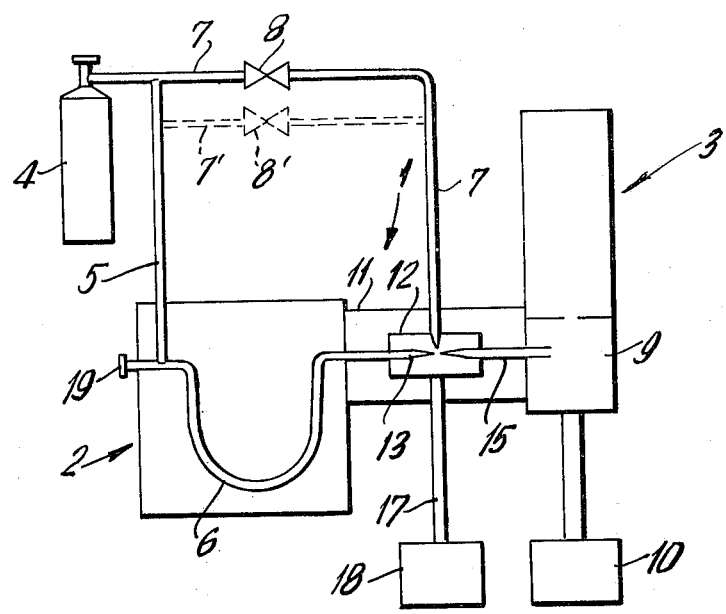
FIG. 1a is a somewhat schematic illustration of gas chromatography apparatus embodying the invention.
Figure 1B:
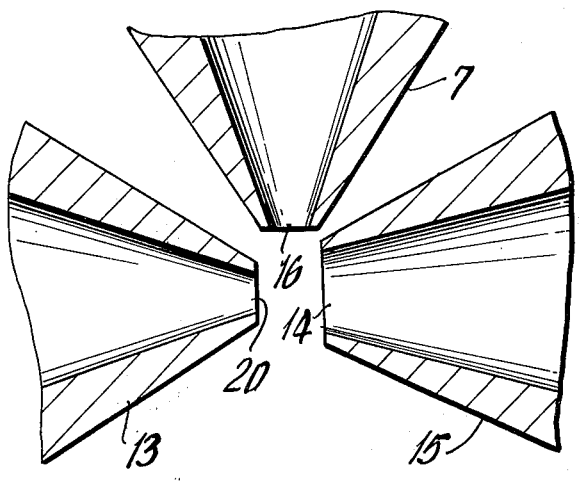
FIG. 1b is a greatly enlarged sectional view illustrating the main inlet in the separating chamber, the outlet and the auxiliary gas inlet.

Referring to FIG. 1a, the illustrated apparatus includes a separator, generally indicated at 1, a gas chromatograph 2 and a mass spectrometer 3. A storage tank 4 is provided for a carrier gas, such as helium, which may also be used as an auxiliary gas, and a gas line 5 supplies the carrier gas to the gas chromatography separating column 6. A second gas line 7 supplies auxiliary gas to the separator 1, and is provided with a control valve 8.

The enriched gas leaving the separator 1 is supplied to an ionization chamber 9 of mass spectrometer 3, a vacuum pump 10 being connected to ionization chamber 9. The housing 12 of the separator 1 is received in a heatable connection part 11. The gas from separating column 6 is directed into separator housing 12 through a nozzle 13 which is coaxially aligned with an outlet nozzle 14, for the useful gas, connected to a conduit 15 for evacuating the useful stream to the mass spectrometer. A nozzle 16 is connected to line 7 for directing a stream of auxiliary gas into the separator housing 12. An evacuation line 17 connects separator 1 to a vacuum pump 18 for maintaining the separator under a vacuum. The apparatus also includes an injector 19 for the mixture of the carrier gas and the gas to be analyzed. The opening of inlet nozzle 13 is indicated at 20.

Figure 2A:
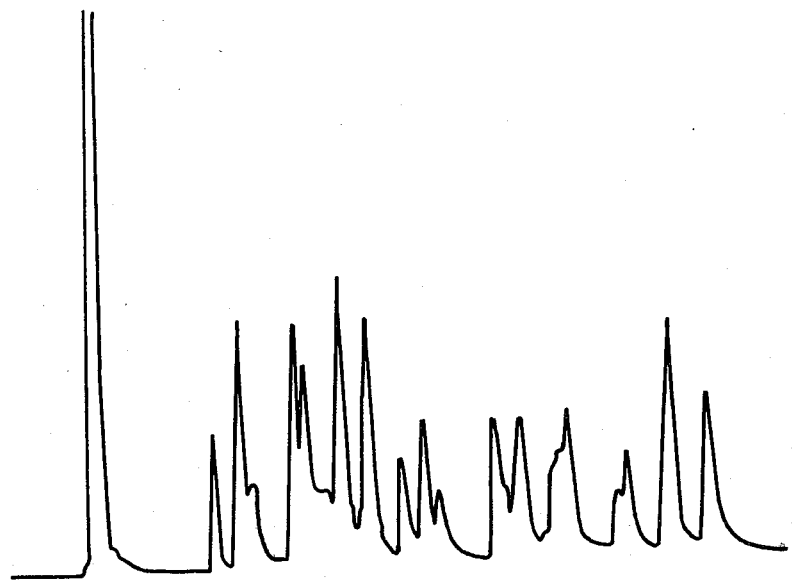
FIGS. 2a and 2b are explanatory graphs.
Figure 2B:
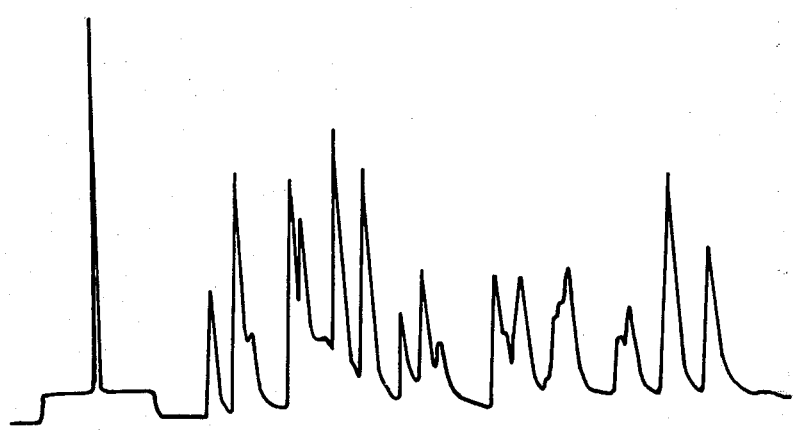

In operation, after the mixture of carrier gas, for example helium, and the gas to be analyzed, has passed through separating column 6, where it is separated into the individual components indicated by the peaks in FIGS. 2a and 2b, the gas mixture is delivered through nozzle 13 into the inner space of separator 1, which is continuously evacuated, during operation, by means of pump 18. The inflowing gas stream expands and, as is well known, the core portion passes through the outlet nozzle opening 14 of connection conduit 15 to the ion source of mass spectrometer 3, while the peripheral portion of the mixture is continuously evacuated through line 17. In accordance with the operational conditions of the particular case, a larger portion, up to 90% for example, of the carrier gas may thereby be separated and a relative enrichment in analysis gas, relative to the carrier gas, is obtained in the stream of useful gas reaching ionization chamber 9. Thus far, the described arrangement corresponds to the known prior art.

The patentable novelty of the present invention resides in the supply conduit 7, for the auxiliary gas, extending through the wall of housing 7 and terminating, in the separator, through an inlet nozzle opening 16. Auxiliary gas conduit 7 is connected, through the valve 8, to a source of auxiliary gas. In the present example, the carrier gas is also used as the auxiliary gas by virtue of the connection of conduit 7 to the tank 4. Inlet opening 16, for the auxiliary gas, is so arranged, relative to the inlet nozzle 13 and the outlet opening 14, that the axis of the stream of auxiliary gas directed through nozzle 16 intersects the axis of the gas stream discharged from nozzle 13, preferably at a right angle. However, the auxiliary gas stream may be deviated so as to form other intersection angles.

The appropriate intensity of the deviating auxiliary gas stream is determined most simply by a preliminary trial. The starting and stopping of the stream may be controlled manually, or with the aid of an automatic device as a function of the retention time of each component.

Thus, the device embodying the invention makes it possible to control the portion of the individual gas-chromatographically separated components passing into the detector, and there is no need to provide a mechanical shut-off element in the stream of gas to be analyzed. Valve 8, for controlling the deviating auxiliary gas stream, is located outside the heated zone. Another advantage is that the stream flowing to the mass spectrometer is not entirely interrupted, but can be choked down to an appropriate value so that, for each individual gas component of the gas to be analyzed, a detection efficiency can be adjusted, which is reduced in the desired proportion and reproducible.

As further shown in FIG. 1a, supply conduit 7 for the auxiliary gas can be divided into several, such as two, branches as indicated by the conduit 7' and valve 8' shown in broken lines in FIG. 1a. Each branch may be provided with its own valve whose conductance is dimensioned so that, with a fully open valve, exactly the appropriate stream of auxiliary gas is obtained as necessary to reduce a certain gas-chromatographic component to a preselected value. The provision of a plurality of such valves offers the advantage that, in the course of the analysis, the respective appropriate stream of auxiliary gas can rapidly be put into action while an accurate adjustment of a needle valve requires more attention and time.

Experience has shown that, with the device embodying the invention, the stream of useful gas can be adjusted with a sufficiently accurate reproducibility between its full value and a portion which is reduced to 0.0001 of this value or even more. Such a large range of adjustability makes it possible to adapt to any requirement. A mechanical shut-off member, mounted in the separator, on the contrary would permit such an adjustment only through a mechanical precision device. As should be obvious to anyone having ordinary skill in the art, the separator embodying the invention can be used not only in gas chromatography, but also in any application where an enrichment of individual components of a gas mixture is required. Stream separators are used also, for example, for the separation of isotopes and, in general, in other analytical measuring devices, for preliminary enrichment of interesting components. In such cases, the inventive stream separator may be used advantageously any time the adjustability of the stream of useful gas is needed.

Another field of application for the device of the invention is in plant equipments where the interesting components are separated from a mixture in a gas chromatographic manner and conveyed into a collecting tank while the components having other retention times are to be kept away from the collecting tank. It should be understood that, where gases are mentioned in the description and in the claims, the term gases is understood to further include vapors.

While a specific embodiment of the invention has been shown and described in detail to illustrate the application of the principles of the invention, it will be understood that the invention may be embodied otherwise without departing from such principles.

I claim:

1. In a separator for separating gases having different molecular weights, such as for separating the lighter carrier gas from the heavier gas to be analyzed in gas chromatography, of the type having an evacuable chamber serving as a jet separator and provided with an inlet nozzle for directing a molecular jet of the mixed gas into the chamber for undisturbed expansion therein, an outlet nozzle coaxially aligned with the inlet nozzle and facing and adjacently spaced therefrom to split the molecular jet of gases into a heavier useful core portion, flowing through the outlet nozzle, and a lighter residual peripheral portion, the axial spacing of the inlet and outlet nozzles being such that the molecular jet of mixed gases leaving the inlet nozzle traverses the space between the inlet and outlet nozzles while maintaining its molecular flow without turbulence, means controlling the volume of the stream of heavier useful gas removed through the outlet nozzle, and a connection to a pump for evacuating the lighter residual gas from the chamber, the improvement comprising, in combination, a conduit including a further inlet nozzle opening and — adjacent said inlet and outlet nozzles in said chamber; and means connected to said further inlet nozzle for directing a regulable stream of auxiliary gas under pressure through said further inlet nozzle opening in a direction to intersect and controllably deflect said molecular jet in the space between said inlet and outlet nozzles to control the amount of heavier useful gas entering said outlet nozzle and flowing therethrough.

2. In a separator for separating gases having different molecular weights, the improvement claimed in claim 1 including a supply conduit, for the auxiliary gas, connecting said further inlet opening to a source of auxiliary gas; and a valve interposed in said supply conduit and having an adjustable gas conductance.

3. In a separator for separating gases having different molecular weights, the improvement claimed in claim 2, in which said supply conduit for the auxiliary gas is divided into plural branches each having interposed therein a said valve with adjustable gas conductance.

4. In a separator for separating gases having different molecular weights, the improvement claimed in claim 1, in which said separator forms part of a chromatographic arrangement; said arrangement including a storage tank for supplying the carrier gas; said auxiliary gas supply conduit being connected to said storage tank for the carrier gas.

5. In a separator for separating gases having different molecular weights, the improvement claimed in claim 1, in which said further inlet opening comprises a nozzle having an axis intersecting the common axis of said first-mentioned nozzles at a point between said first-mentioned nozzles.

6. In a separator for separating gases having different molecular weights, the improvement claimed in claim 5, in which the axis of said last-mentioned nozzle constituting said further inlet nozzle opening intersects the common axis of the nozzles constituting said first-mentioned inlet nozzle opening and said outlet nozzle opening at a right angle.

* * * * *